United States Patent [19]

Tanguy

[11] Patent Number: 4,534,382
[45] Date of Patent: Aug. 13, 1985

[54] THREE-WAY SOLENOID VALVE
[75] Inventor: Christian Tanguy, Frepillon, France
[73] Assignee: Societe Anonyme D.B.A., Paris, France
[21] Appl. No.: 588,175
[22] Filed: Mar. 12, 1984
[30] Foreign Application Priority Data Mar. 21, 1983 [FR] France ................ 83 04581

[51] Int. Cl.³ .......................................... F15B 13/044
[52] U.S. Cl. .............................. 137/627.5; 137/596.17; 137/625.65; 137/870
[58] Field of Search ..................... 137/596.17, 625.65, 137/627.5, 870

[56] References Cited

U.S. PATENT DOCUMENTS

| 3,043,336 | 7/1962 | Parent et al. | 137/596.17 X |
| 3,542,333 | 11/1970 | Stampfli | 137/625.65 X |
| 3,921,666 | 11/1975 | Leiber | 137/596.17 X |
| 3,983,909 | 10/1976 | Anglade | 137/625.65 |
| 3,989,063 | 11/1976 | Brouwers et al. | 137/596.17 |

FOREIGN PATENT DOCUMENTS

| 1179068 | 5/1965 | Fed. Rep. of Germany . |
| 2643862 | 3/1978 | Fed. Rep. of Germany | 137/596.17 |
| 2711140 | 9/1978 | Fed. Rep. of Germany | 137/627.5 |
| 2208078 | 6/1974 | France . |

Primary Examiner—Gerald A. Michalsky
Attorney, Agent, or Firm—Larry J. Palguta; Ken C. Decker

[57] ABSTRACT

The invention concerns a solenoid valve with three ways and three positions, having a general construction with symmetry of revolution about an axis (1) and incorporating a magnetic armature (4) which is movable in translation along this axis under the action of an electromagnetic coil (3) and of a return spring (10). This armature is hollow and incorporates internally two valves (56a, 56b), movable relative to one another and relative to the armature (4), separated from one another by a spring (12) and provided with flanges (11a, 11b) by the intermediary of which they can be displaced by the movable armature (4), facing respective fixed seats (7a, 7b) which they are capable of closing. Each valve is pushed to the closed position by the intermediary of a spacer block (13) in point contact at the point (C) with the valve (56b).

11 Claims, 4 Drawing Figures

THREE-WAY SOLENOID VALVE

The invention concerns a solenoid valve with three ways and three positions, having a general construction with symmetry of revolution about an axis and incorporating a magnetic armature which is movable in translation along this axis under the action of an electromagnetic coil and of a return spring, this armature being hollow and incorporating internally two valves situated on the axis, movable relative to one another and relative to the armature, separated from one another by a spring and provided with flanges by the intermediary of which they can be displaced by the movable armature, facing respective fixed seats which they are capable of closing. As described, for example, in French Patent Application No. A-2,259,303.

In known solenoid valves of this type, the movable armature pushes each of the valves to its closed position directly by its flange. The result is that any fault of machining or of mounting of these components can be the cause of an angular misalignment of the valve, which then is not positioned exactly opposite the seat which it must close, so that there is a risk of defective closure and hence of leakage of the fluid (pneumatic or hydraulic) applied to the solenoid valve.

In addition, such a method of operation of the valves by the armature requires the provision, between the flanges of the valves, of a tubular spacer block firmly fixed to the armature, this spacer block co-operating with either of the flanges so as to transmit to the corresponding valve the thrust force of the movable armature towards the seat of the latter. Such an arrangement complicates the mounting of the valves in the movable armature.

With the aim of overcoming these disadvantages, the subject of the invention is a solenoid valve of the type defined above, in which the movable armature operates each valve, so as to apply it to its respective seat, by the intermediary of the flange of the other valve and of a spacer block coming to bear in point contact against the inner end of one of the valves. This point contact avoids any undesirable oblique position of either valve when it approaches its seat to carry out the closure of it. On the contrary, each valve can only maintain a precise alignment facing its seat. It is convenient that the aforementioned point contact is positioned at a point located essentially on the axis of symmetry of the solenoid valve.

The spacer block can consist of an independent component freely interposed between the valves. This spacer block, designed to come to bear with point contact against one of the valves, can furthermore be firmly fixed to the other valve, either fixed to the latter, or integral with it.

Advantageously, the point contact is made between a plane surface perpendicular to the axis of symmetry and a domed surface, one forming part of the valve and the other forming part of the spacer block. Preferably this domed surface forms part of the spacer block and the plane surface forms part of the valve, the latter then being able to be formed by the end face of the flange of this valve. The domed surface is advantageously formed by a spherical ball. In this case, when the closing components of the valves are formed by balls, these balls and the point contact ball, in line on the axis of symmetry, can be identical.

The arrangement according to the invention enables the retention of the valves in the movable armature to be provided by the simple interposition of the assembly of their flanges between a pair of guide rings for the valves, only one of these rings being fixed so as to be removable in the movable armature. This leads to a particularly easy method of mounting the valves in the movable armature.

Other characteristics and advantages of the invention will be better understood from the description which follows, with reference to the accompanying drawings, of an embodiment which is not limiting.

Figure 1:
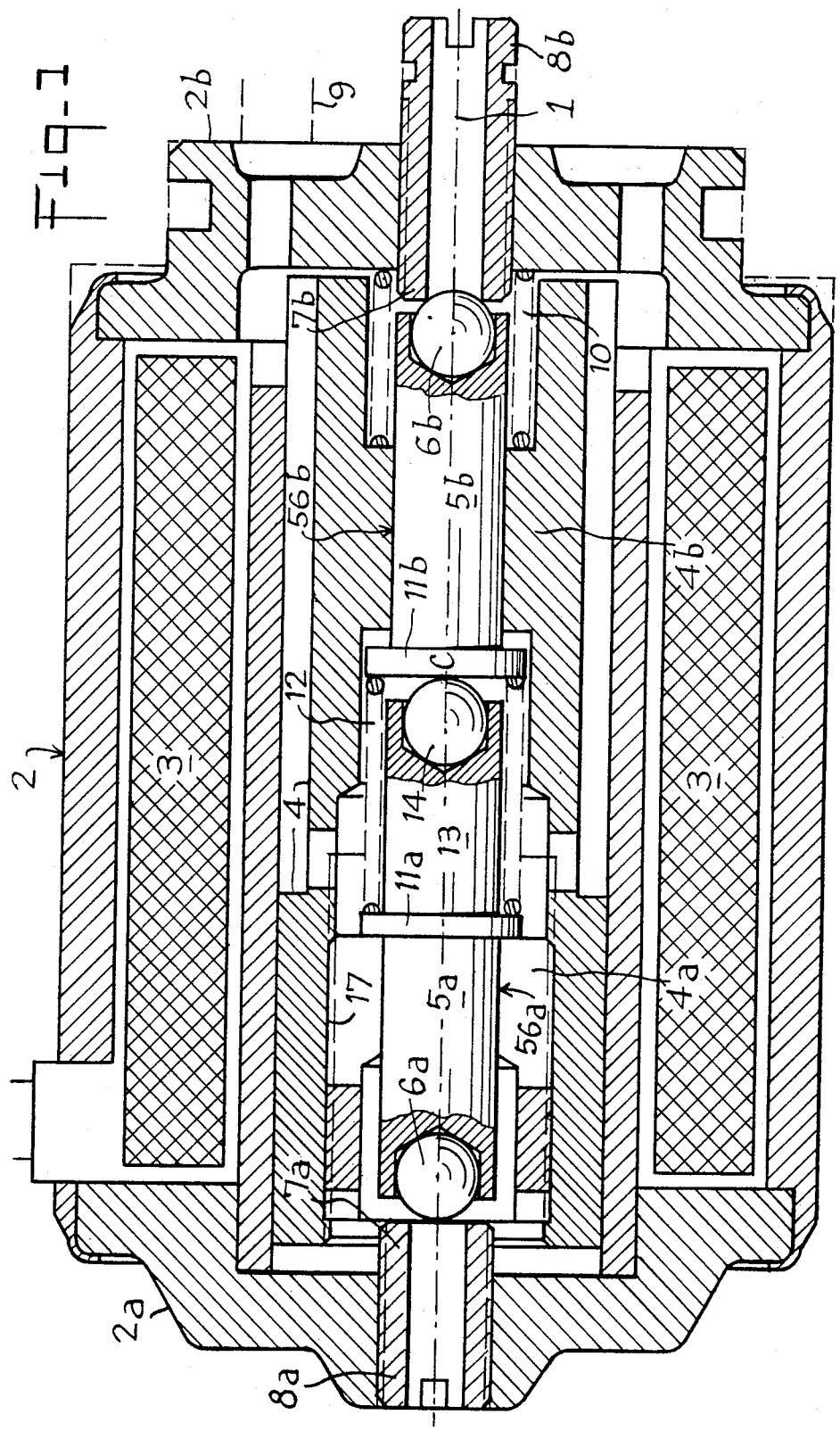
FIG. 1 shows an axial section of a solenoid valve according to the invention.

The three-way solenoid valve shown in FIG. 1, whose general construction has symmetry of revolution about an axis 1, incorporates, in a casing 2, an electromagnetic coil 3 capable of causing displacement in translation along the axis 1 of a movable armature 4. The latter is hollow and incorporates internally guide rings 4a, 4b in which two valves 56a, 56b respectively, can slide, consisting of cylindrical components 5a, 5b carrying at their outer end balls 6a, 6b each of which is able to close a respective seat 7a, 7b, these seats appearing at the inner ends of ports 8a, 8b mounted coaxially with the axis 1 in end covers 2a, 2b of the casing 2. According to each of the three positions which the movable armature 4 can occupy, each port 8a, 8b can either be closed, or connected to a third port 9 (by the intermediary of passages provided for this purpose around and through the movable armature 4).

The movable armature 4 is pushed to the left (as shown in FIG. 1) by a return spring 10, whereas the coil 3, excited by an electric current, pushes it to the right. The cylindrical components 5a, 5b incorporate, at their ends which are nearest the center of the armature 4, a flange 11a, 11b, each of which can co-operate with the respective guide ring 4a, 4b. The components 5a, 5b and therefore their balls 6a, 6b are mutually separated by a compression spring 12 interposed between the flanges 11a, 11b.

The component 5a is extended, beyond its flange 11a, by a spacer block 13 firmly fixed to the flange, which carries at its end a ball 14 capable of coming into point contact with the center C of the flange 11b of the other component 5b, this point being located essentially on the axis 1.

Figure 2:
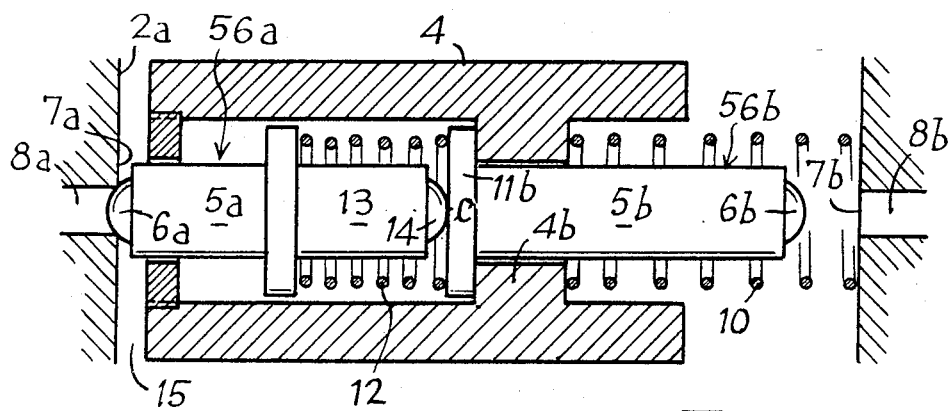
FIGS. 2 to 4 show diagrammatically the three operating positions of the solenoid valve shown in FIG. 1.
Figure 3:
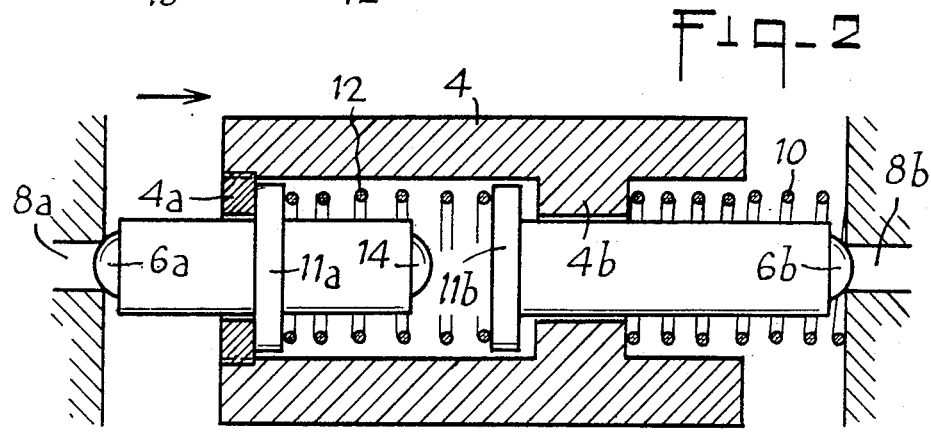
Figure 4:
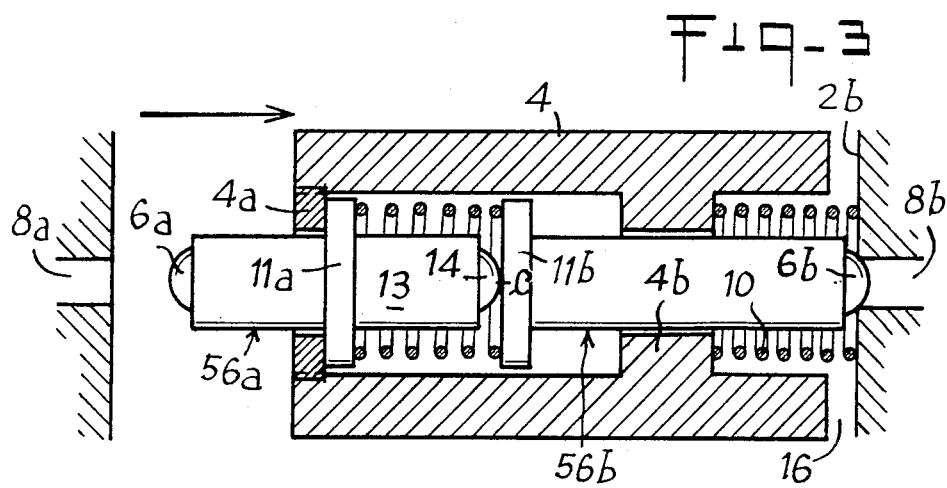

The operation of the solenoid valve will now be explained with the aid of the diagrammatic FIGS. 2 to 4. When the coil 3 (not shown in these figures) is not excited, the movable armature is pushed back to the left by the spring 10 to its rest position, defined by the coming into abutment of the guide ring 4b against the flange 11b of the valve 56b, of this flange 11b against the ball 14 forming part of the spacer 13 and of the ball 6a forming part of the valve 56a against its seat 7a, while at the same time the valve 56b is drawn to the left by its flange 11b, so that the ball 6b of this valve is separated from its seat 7b. The port 8b is then joined to the port 9 (not shown), the port 8a being closed. In order to avoid any undesirable sticking of the armature 4, the dimensions of these components are calculated so that there exists in this first extreme position a gap 15, which is not zero, between the armature 4 and the left hand cover 2a. In this position, the spring 12, which is not as stiff as the spring 10, is compressed by the latter between the flanges 11a and 11b.

When the coil 3 is subjected to a semi-excitation, it causes the armature 4 to be displaced to the right to an intermediate position of equilibrium against the force of the slightly compressed spring 10. In this position (FIG. 3) the flange 11a abuts against the guide ring 4a while the flange 11b remains disengaged from the guide ring 4b. The spring 12 expands and applies the balls 6a, 6b against their seats 7a, 7b, while the ball 14 separates from the flange 11b. The two ports 8a and 8b are then closed.

If a full excitation is applied to the coil 3, it displaces the armature 4 to the right, with compression of the spring 12, as far as the second extreme position (FIG. 4) defined by the coming into abutment of the guide ring 4a against the flange 11a of the valve 56a, and the ball 14 forming part of the spacer block 13 against the flange 11b of the valve 56b, the ball 6b of the latter closing the port 8b, while the port 8a is put into communication with the port 9. The dimensions of the components are calculated so that, in this case also, there remains a gap 16 which is not zero, between the armature 4 and the right hand cover 2b.

It will be noticed that to reach their respective closed positions, the valves 56a, 56b are pushed, owing to the displacement of the armature 4, by the intermediary not of their respective flanges 11a, 11b but of the ball 14 in point contact with the flange 11b of the component 5b (FIGS. 2 and 4), which ensures automatic alignment of the valves 56a, 56b with the axis 1 and thus of their balls 6a, 6b with the seats 7a, 7b of the latter. This ensures operation of the solenoid valve which is perfect and without leakage under all circumstances.

In addition, the structure corresponding to the movable assembly formed by the armature 4 and the valves 56a, 56b provides very simple and easy assembly of the latter. It is only necessary to introduce the valve 56b into the guide ring 4b, which is integral with the armature 4, then the valve 56a after interposing the spring 12, and finally to screw into the armature 4 the guide ring 4a with the aid of a thread 17 provided for this purpose.

A solenoid valve such as that described finds application, for example, in the anti-skid braking systems for motor vehicles. The port 9 being connected to a brake cylinder, the port 8b to the source of fluid under pressure and the port 8a to the system reservoir or to the atmosphere, the first position of the solenoid valve corresponding to a braking phase, the second position to a phase in which braking is released and the intermediate position to a phase in which the existing braking force is maintained.

I claim:

1. A three-way solenoid valve with three positions, having a general construction with symmetry of revolution about an axis and incorporating a magnetic armature which is movable in translation along the axis under the action of an electromagnetic coil and a return spring, the armature being hollow and incorporating internally two valve members each having an inner end and situated on the axis, the two valve members movable relative to one another and relative to the armature, separated from one another by a spring and provided with flanges through which the two valve members can be displaced by the magnetic armature with respect to respective facing fixed seats which the two valve members are capable of closing, characterized in that the magnetic armature operates each valve member so as to apply one valve member against the respective seat by means of the flange of the other valve member and a spacer positioned between the inner ends of the valve members, the spacer moving to bearing engagement against the inner end of one of the valve members.

2. The solenoid valve according to claim 1, characterized in that the bearing engagement of the spacer against the one valve member is a point contact engagement at a point situated substantially on said axis.

3. The solenoid valve according to claim 2, characterized in that the point contact is made between a plane surface disposed perpendicular to the axis and a domed surface, one forming part of the one valve member and the other forming part of the spacer.

4. The solenoid valve according to claim 3, characterized in that the domed surface forms part of the spacer and the plane surface forms part of the one valve member.

5. The solenoid valve according to claim 3, characterized in that the domed surface is formed by a spherical ball.

6. The solenoid valve according to claim 5, characterized in that each valve member comprises a closing component consisting of a closing ball, the closing balls and the spherical ball which is aligned with the axis, being the same size.

7. The solenoid valve according to claim 1, characterized in that the spacer, moving to bearing engagement against said one of the valve members, is fixed firmly to the other valve member.

8. The solenoid valve according to claim 1, characterized in that the valve members are retained in the magnetic armature by the interposition of the flanges between a pair of guide rings for the valve members, one of the rings being removably engaged with the magnetic armature.

9. A solenoid valve, having a general construction about a symmetry axis and comprising a magnetic armature which is movable in translation along said axis between two opposite end positions and under the action of electromagnetic coil means and return spring means, said armature being hollow and incorporating internally two valve members each having an inner end and movable relative to one another and relative to the armature and along said axis, separated from one another by a spring and provided with outwardly extending flanges through which the two valve members can be displaced by said magnetic armature and relative to associated fixed seats, the fixed seats each at a respective end position of said armature, wherein a first of said valve members can seat against the associated fixed seat and a second of said valve members can separate from the associated fixed seat, the seating and separating being determined by bearing engagement of said armature with the flange of said second valve member which is in bearing engagement with said first valve member by means of a spacer member arranged coaxially between said first and second valve members.

10. The solenoid valve according to claim 9, characterized in that the spacer member cooperates in bearing engagement with the inner end of the first valve member by means of a point contact engagement at a point situated substantially on said symmetry axis.

11. The solenoid valve according to claim 10, characterized in that said spacer member is integral with the second valve member.

* * * * *